United States Patent
Hoerschler et al.

(10) Patent No.: US 11,491,844 B2
(45) Date of Patent: Nov. 8, 2022

(54) AIR VENT FOR A MOTOR VEHICLE AND MOTOR VEHICLE EQUIPPED THEREWITH

(71) Applicant: Bayerische Motoren Werke Aktiengesellschaft, Munich (DE)

(72) Inventors: Ingolf Hoerschler, Munich (DE); Stefan Zemsch, Munich (DE); Rene Zocher, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 576 days.

(21) Appl. No.: 16/419,198

(22) Filed: May 22, 2019

(65) Prior Publication Data

US 2019/0270363 A1 Sep. 5, 2019

Related U.S. Application Data

(63) Continuation of application No. PCT/EP2017/081808, filed on Dec. 7, 2017.

(30) Foreign Application Priority Data

Dec. 15, 2016 (DE) .................... 10 2016 225 128.7

(51) Int. Cl.
*B60H 1/00* (2006.01)
*B60H 1/34* (2006.01)

(52) U.S. Cl.
CPC ....... *B60H 1/00685* (2013.01); *B60H 1/3414* (2013.01); *B60H 2001/3478* (2013.01)

(58) Field of Classification Search
CPC ............. B60H 1/3414; B60H 1/00685; B60H 2001/3478

(Continued)

(56) References Cited

U.S. PATENT DOCUMENTS 3,661,069 A * 5/1972 Grosseau ........... B60H 1/00007
454/160
3,709,139 A * 1/1973 Behles ................. B60H 1/3407
454/152

(Continued)

FOREIGN PATENT DOCUMENTS

CN 101596850 A 12/2009
CN 102452293 A 5/2012

(Continued)

OTHER PUBLICATIONS

International Search Report (PCT/ISA/210) issued in PCT Application No. PCT/EP2017/081808 dated Mar. 13, 2018 with English translation (six pages).

(Continued)

*Primary Examiner* — Edelmira Bosques
*Assistant Examiner* — Frances F. Hamilton
(74) *Attorney, Agent, or Firm* — Crowell & Moring LLP

(57) ABSTRACT

An air vent in a motor vehicle interior includes an air supply channel, a first air discharge channel, which branches off from the air supply channel and includes a first air inlet opening and a first air outlet opening. The air vent also includes a second air discharge channel, which branches off from the air supply channel and includes a second air inlet opening and a second air outlet opening, and an air adjuster for adjustment of the quantity of air transported through the first air discharge channel and the second air discharge channel. The air adjuster has a round cross-section, on the outer face of which a first, a second, and a third segment are provided, which are spaced apart from one another, and which respectively close or at least partially open the first air inlet opening, the second air inlet opening, or the air supply channel, as required.

5 Claims, 5 Drawing Sheets

(58) Field of Classification Search
USPC .................................................. 454/143, 155
See application file for complete search history.

(56) References Cited

U.S. PATENT DOCUMENTS

| | | | |
|---|---|---|---|
| 3,824,910 A | 7/1974 | Temming | |
| 4,253,384 A * | 3/1981 | Schmidt ............. | F24F 13/0604 454/284 |
| 4,413,550 A * | 11/1983 | Piano ................. | B60H 1/00685 454/143 |
| 6,645,065 B2 * | 11/2003 | Rooney ............... | B60H 1/3442 454/154 |
| 6,941,967 B2 * | 9/2005 | Butera ................ | B60H 1/00842 137/351 |
| 7,201,650 B2 * | 4/2007 | Demerath ............ | B60H 1/3414 454/154 |
| 9,950,592 B2 * | 4/2018 | Zhang ................. | B60H 1/3414 |
| 2006/0068694 A1 * | 3/2006 | Tajiri ................. | B60H 1/00685 454/152 |
| 2012/0034859 A1 * | 2/2012 | Meehan ............. | B60H 1/00685 454/152 |
| 2016/0101668 A1 * | 4/2016 | Doll ................... | B60H 1/345 454/155 |
| 2016/0152116 A1 * | 6/2016 | Albin ................. | B60H 1/3421 454/155 |
| 2016/0250909 A1 * | 9/2016 | Schneider ........... | B60H 1/3421 454/155 |
| 2017/0120722 A1 * | 5/2017 | Cho ................... | B60H 1/00685 |
| 2018/0056756 A1 * | 3/2018 | Schaal ................ | B60H 1/3414 |
| 2020/0361282 A1 * | 11/2020 | Kim .................... | B60H 1/24 |

FOREIGN PATENT DOCUMENTS

| | | | | |
|---|---|---|---|---|
| CN | 109823143 A | * | 5/2019 | |
| DE | 2 230 239 A | | 1/1974 | |
| DE | 4228866 A1 | * | 3/1994 | ......... B60H 1/00685 |
| DE | 197 17 413 C1 | | 5/1998 | |
| DE | 197 07 405 A1 | | 8/1998 | |
| DE | 19707405 A1 | * | 8/1998 | ............. B60H 1/345 |
| DE | 19808676 A1 | * | 9/1999 | ......... B60H 1/00685 |
| DE | 10 2014 101 315 A1 | | 4/2015 | |
| DE | 102016202573 A1 | * | 8/2017 | |
| DE | 102017113906 A1 | * | 8/2017 | ........... B60H 1/3414 |
| EP | 0 412 066 A1 | | 2/1991 | |
| EP | 0 681 934 A1 | | 11/1995 | |
| EP | 1334850 A1 | * | 8/2003 | ......... B60H 1/00685 |
| EP | 3702185 A1 | * | 9/2020 | |
| WO | WO-2012108146 A1 | * | 8/2012 | ......... B60H 1/00685 |

OTHER PUBLICATIONS

German-language Written Opinion (PCT/ISA/237) issued in PCT Application No. PCT/EP2017/081808 dated Mar. 13, 2018 (five pages).
German-language Search Report issued in counterpart German Application No. 10 2016 225 128.7 dated Jul. 4, 2017 with partial English translation (13 pages).
English translation Office Action issued in Chinese Application No. 201780063996.2 dated Oct. 9, 2021 (seven (7) pages).

* cited by examiner

AIR VENT FOR A MOTOR VEHICLE AND MOTOR VEHICLE EQUIPPED THEREWITH

CROSS REFERENCE TO RELATED APPLICATIONS

This application is a continuation of PCT International Application No. PCT/EP2017/081808, filed Dec. 7, 2017, which claims priority under 35 U.S.C. § 119 from German Patent Application No. 10 2016 225 128.7, filed Dec. 15, 2016, the entire disclosures of which are herein expressly incorporated by reference.

BACKGROUND AND SUMMARY OF THE INVENTION

The present invention relates to an air vent for a motor vehicle and a motor vehicle which is equipped with such an air vent.

DE 10 2014 101 315 A1 discloses an air vent which comprises an air supply channel for supplying air-conditioned or non-air-conditioned air into a vehicle inner space. It further has a first air discharge channel which branches off from the air supply channel and which comprises a first air inlet opening and a first air outlet opening, and a second air discharge channel which branches off from the air supply channel and which comprises a second air inlet opening and a second air outlet opening. The first air inlet opening and the second air inlet opening are constructed parallel with each other in fluid terms. The first air outlet opening and the second air outlet opening are spaced apart from each other.

In order to adjust the quantity of air transported through the first air discharge channel and the second air discharge channel, there is provided an air adjuster which is arranged adjacent to the first air inlet opening and the second air inlet opening. The air adjuster known from the prior art comprises at least two flaps which are supported in the respective outer region of the first and second air inlet openings so as to be able to be pivoted about respective pivot axes in the direction of the center of the air supply channel and back again. In order to change the quantity of air discharged from the first air outlet opening and/or the second air outlet opening, the flaps can each be individually controlled in order to be completely or partially introduced in the flow path of the air. In an unfavorable manner, the air adjuster known from the prior art is constructed in a complex manner.

An object of the present invention is to overcome this disadvantage.

This and other objects are achieved by an air vent for a motor vehicle according to embodiments of the invention.

The air vent provided for a motor vehicle has an air supply channel which—upstream when viewed in the flow direction—is connected in fluid terms (or fluidly) to a fan and/or an air-conditioning system. From the air supply channel—downstream when viewed in the flow direction—a first air discharge channel and a second air discharge channel branch off. The first air discharge channel has a first air inlet opening which is adjacent to the air supply channel and a first air outlet opening. The second air discharge channel has a second air inlet opening which is adjacent to the air supply channel and which is parallel in fluid terms with the first air inlet opening and a second air outlet opening which is spaced apart from the first air outlet opening. The air transported through the air supply channel can flow out through the first air outlet opening and the second air outlet opening into a vehicle inner space.

The quantity of air flowing into the motor vehicle inner space is adjusted by an air adjuster which is arranged in the air supply channel and adjacent to the first air inlet opening and the second air inlet opening.

The air adjuster is distinguished in that it has a round, preferably circular, cross-section at the outer side of which a first portion and a second portion are provided, the first portion and the second portion are spaced apart from each other with an air guiding channel being formed, and the first portion optionally closes or at least partially releases the first air inlet opening, and the second portion optionally closes or at least partially releases the second air inlet opening.

Advantageously, the disclosed air adjuster is constructed in such a simple and robust manner that the air which is introduced through the air supply channel can flow through the two air discharge channels alternately or at the same time.

In the event that air should flow through both air outlet openings, the air adjuster is adjusted in the air supply channel in such a manner that the first portion and the second portion substantially release the first air inlet opening or the second air inlet opening and the air supply channel which is located between them is substantially adjacent to the mentioned air inlet openings.

In the event that air is intended to flow only through the first air outlet opening, the air adjuster is adjusted in such a manner that the first portion substantially releases the first air inlet opening, the second portion substantially closes the second air inlet opening and the air supply channel which is located between them is substantially adjacent to the first air inlet opening.

In the event that air is intended to flow only through the second air outlet opening, the air adjuster is adjusted in such a manner that the first portion substantially closes the first air inlet opening, the second portion substantially releases the second air inlet opening and the air supply channel which is located between them is substantially adjacent to the second air inlet opening.

It should be noted that the above-mentioned adjustments of the air adjuster can advantageously be carried out by way of a simple rotation of the air adjuster about a rotation axis which is, when viewed in cross-section, arranged in particular centrally. A rotation of the air adjuster can advantageously be carried out manually and/or in a manner activated by an actuator.

According to a preferred embodiment, there is provision for the first portion to be arranged adjacent to the first air inlet opening and to have a clear surface-area which at least corresponds to the clear surface-area of the first air inlet opening, and for the second portion to be arranged adjacent to the second air inlet opening and to have a clear surface-area which at least corresponds to the clear surface-area of the second air inlet opening. A tight closure of the first air inlet opening or the second air inlet opening is thereby advantageously achieved.

An advantageous development of the air vent according to the invention in aerodynamic and aeroacoustic terms is achieved if the clear surface-area of the air guiding channel substantially corresponds to the clear surface-area of the region of the air supply channel adjacent thereto.

According to this principle, a throughflow of air through the device according to the invention can be prevented by switching on a fan and/or an air-conditioning system which is arranged upstream of the air vent. According to a preferred embodiment, however, there is provision for the clear surface-area of the first portion and/or the second portion to at least correspond to the clear surface-area of the region of the air supply channel adjacent thereto. If the first portion or the second portion thus faces the air supply channel, they prevent an influx of air into the air guiding channel, wherein the fan and/or the air-conditioning system are advantageously operatively available for other air vents.

Alternatively or cumulatively, there may advantageously be provided a third portion which is in particular radially spaced apart from the first portion and the second portion and which has a clear surface-area which at least corresponds to the sum of the clear surface-area of the first air inlet opening and of the second air inlet opening.

The air vent may be installed in any position in the motor vehicle as long as at least one of the air outlet openings enables a discharge of air into the motor vehicle inner space. In a particularly advantageous manner, the air outlet openings are orientated substantially horizontally. In this instance, the rotation axis of the air adjuster may also be orientated horizontally.

An influence of the direction of the air flowing out of the at least one air outlet opening is achieved in a particularly simple manner if at least one plate is/are located in the first air discharge channel and/or the second air discharge channel. In a particularly advantageous manner, the plate(s) is/are arranged orthogonally with respect to the rotation axis.

It should be noted that the air vent according to the invention may have, as illustrated above, not only a single air adjuster. Instead, it is also possible to provide a plurality of air adjusters which, when viewed in the longitudinal direction of the air vent, are arranged beside each other, in particular directly adjacent to each other, and which are connected in fluid terms to one or more first and/or second air discharge channels.

It is further advantageously possible to provide on the one or more air adjusters more than a first and/or second portion which, when viewed in a radial direction of the air adjusters, have a position and/or size which is identical to or different from each other.

The above-mentioned object is also achieved by a motor vehicle having at least one air vent of the above-mentioned type. The above-mentioned advantages apply accordingly. Such an air vent may advantageously be located in particular on an instrument panel, a central console, a side cover and/or a roof lining.

There follows below, with reference to FIGS. 1 to 5, a detailed, non-prejudicial, in particular non-limiting, description of embodiments of the present invention. Elements which are identical are given the same reference numerals unless indicated otherwise.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
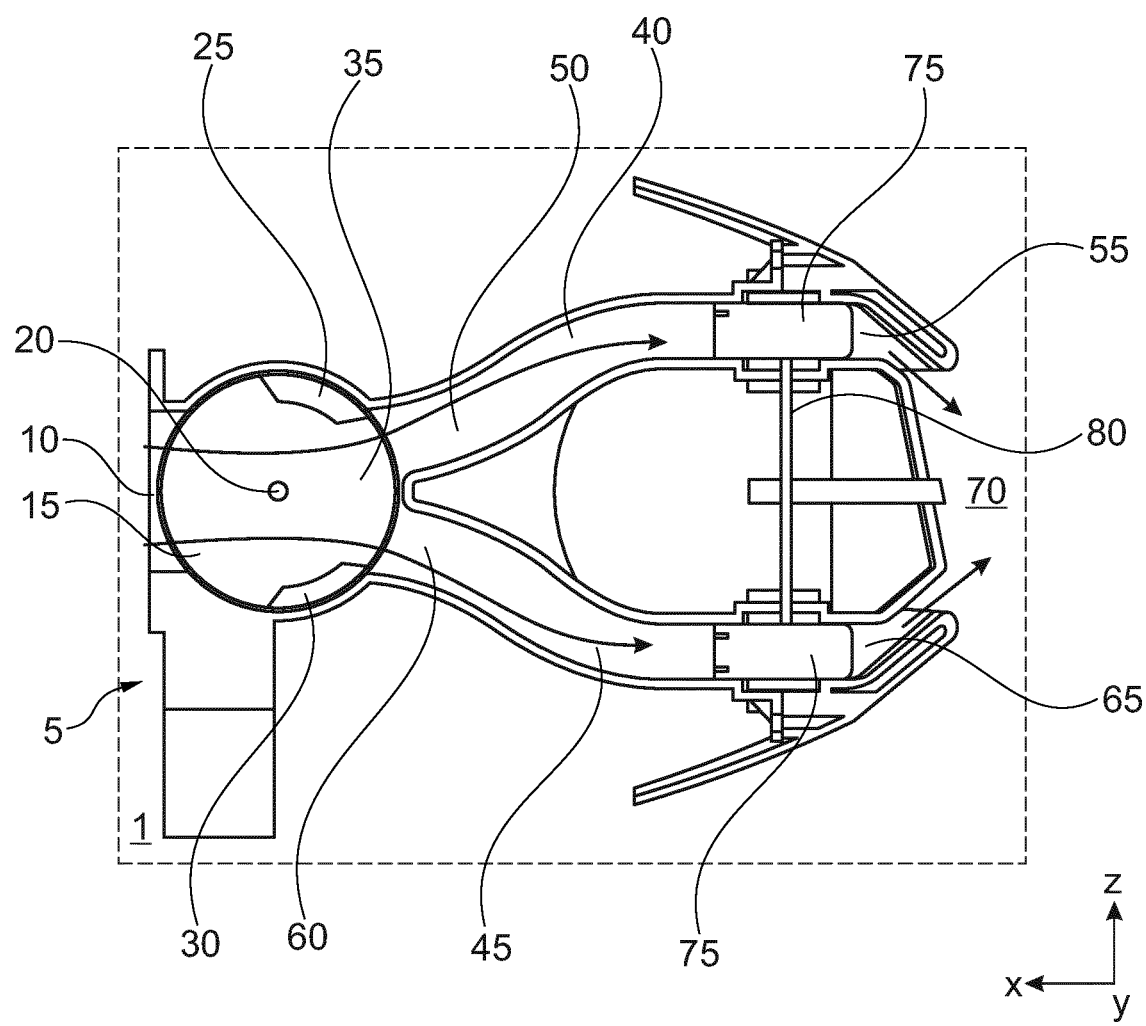
FIG. 1 is a schematic side view of an air vent according to the invention in a first operating position.

FIG. 1 is a schematic side view of a motor vehicle 1 in which an air vent 5 is located. This air vent has an air supply channel 10 into which air (which is indicated with the two arrows) can flow from a fan which is not shown in this instance and/or an air-conditioning system which is not shown in this instance into the air vent 5.

There is connected downstream to the air supply channel 10 an air adjuster 15 whose function will be described below. The air adjuster 15 is constructed in a substantially cylindrical manner. Consequently, the air adjuster 15 is constructed to be substantially circular in cross-section, that is to say, in accordance with a section through the vertical plane (x-z plane) of a Cartesian vehicle-orientated coordinate system known per se, and supported so as to be able to be pivoted about a rotation axis 20 which is located in the central region thereof and which is orientated orthogonally with respect to the vertical plane. There are located in the radial outer region of the air adjuster 15 a first portion 25 and a second portion 30 which is spaced apart therefrom and in the perspective shown they have a cross-section in the form of a circular ring and extend in a longitudinal direction (that is to say, in the y direction of the coordinate system mentioned). Between the first portion 25 and the second portion 30 there is formed an air guiding channel 35 through which the air introduced from the air supply channel 10 can flow in the direction of a first air discharge channel 40 and a second air discharge channel 45. The first air discharge channel 40 has a first air inlet opening 50 and a first air outlet opening 55 which is located downstream thereof. The second air discharge channel 45 has a second air inlet opening 60 and a second air outlet opening 65 which is located downstream thereof.

From the first air outlet opening 55 and the second air outlet opening 65, as indicated by the arrows, air can flow out of the air vent 5 into a motor vehicle inner space 70. To this end, it is necessary—as shown in FIG. 1—for the first portion 25 and the second portion 30 to be located in a position in which both the first air inlet opening 50 and the second air inlet opening 55 are released and the air guiding channel 35 is in fluid communication therewith.

The two air outlet openings 60 and 65 shown in this figure are constructed as gaps which extend substantially in the transverse direction of the motor vehicle 1, that is to say, in the y direction. As a result, an air flow from the air outlet openings 60 and 65 will flow out substantially in the x-z plane. In order to also enable flowing out in other directions, there are provided in the first air discharge channel 40 and the second air discharge channel 45 plates 75 which can be adjusted from the motor vehicle inner space 70 by way of an adjustment mechanism which is known per se and which is depicted here only schematically. The plates 75 are in the embodiment shown here pivotably supported by way of a common pivot axle 80 about a vertical axis z of the motor vehicle 1 so that a direction change of the discharged air in the y direction, consequently in the y-z plane, is possible in a simple manner.

Figure 2:
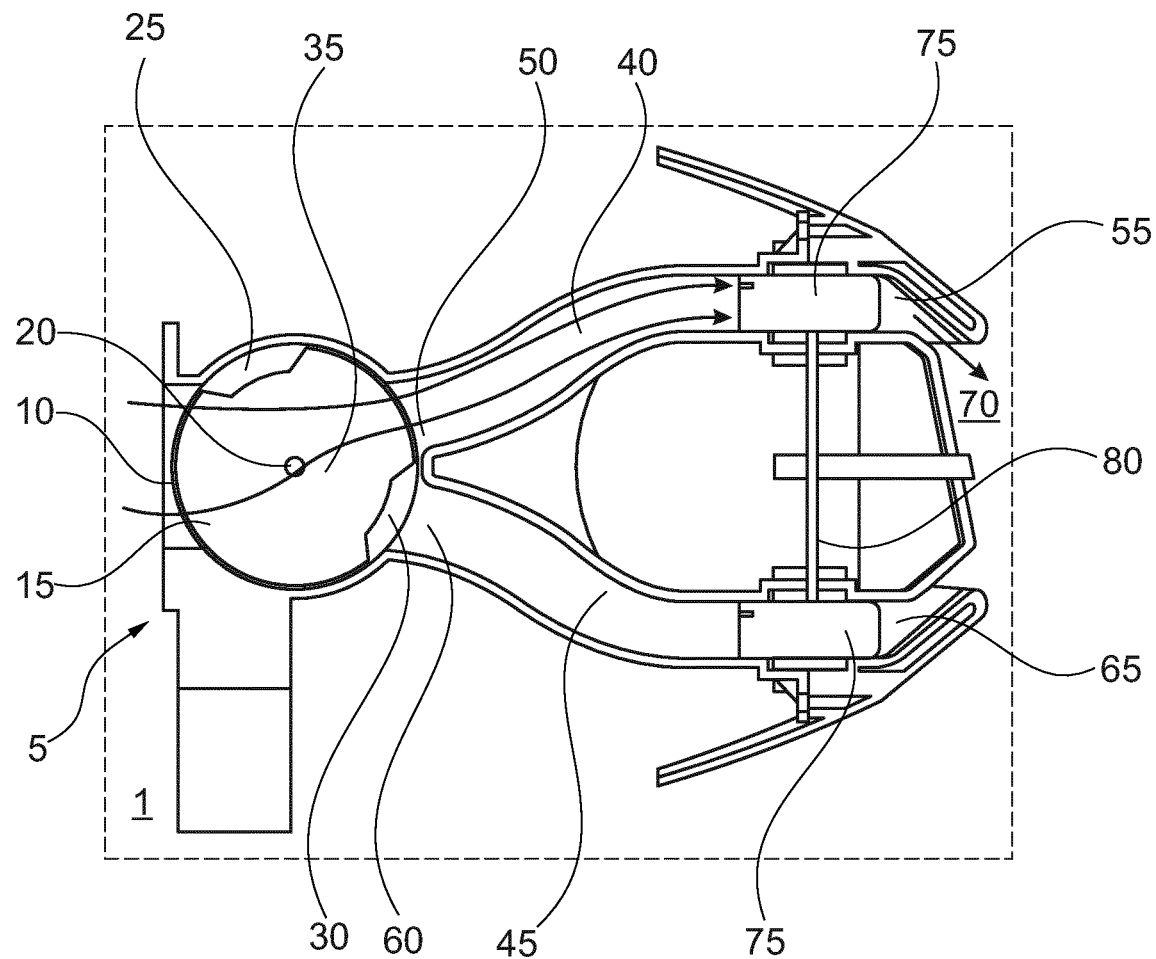
FIG. 2 is a schematic side view of the air vent shown in FIG. 1 in a second operating position.

As can be seen in FIG. 1, both the first air outlet opening 60 and the second air outlet opening 65 are flowed through. By way of an appropriate adjustment of the air adjuster 15 shown in FIG. 2, it is also possible to allow air to flow only through the first air outlet opening 60, whilst the second air outlet opening 65 does not permit any air flow. To this end, it is simply necessary to rotate the air adjuster 15 according to the embodiment in a counter-clockwise direction about the rotation axis 20 in such a manner that the second portion 30 covers the second air inlet opening 60, whilst the first portion 25 releases the first air inlet opening 50.

If in contrast air is intended to flow only through the second air outlet opening 65, whilst the first air outlet opening 60 does not permit any air flow, it is only necessary to rotate the air adjuster 15 in a clockwise direction about the rotation axis 20 in such a manner that the second portion 30 releases the second air inlet opening 60, whilst the first portion 25 covers the first air inlet opening 50.

Figure 3:
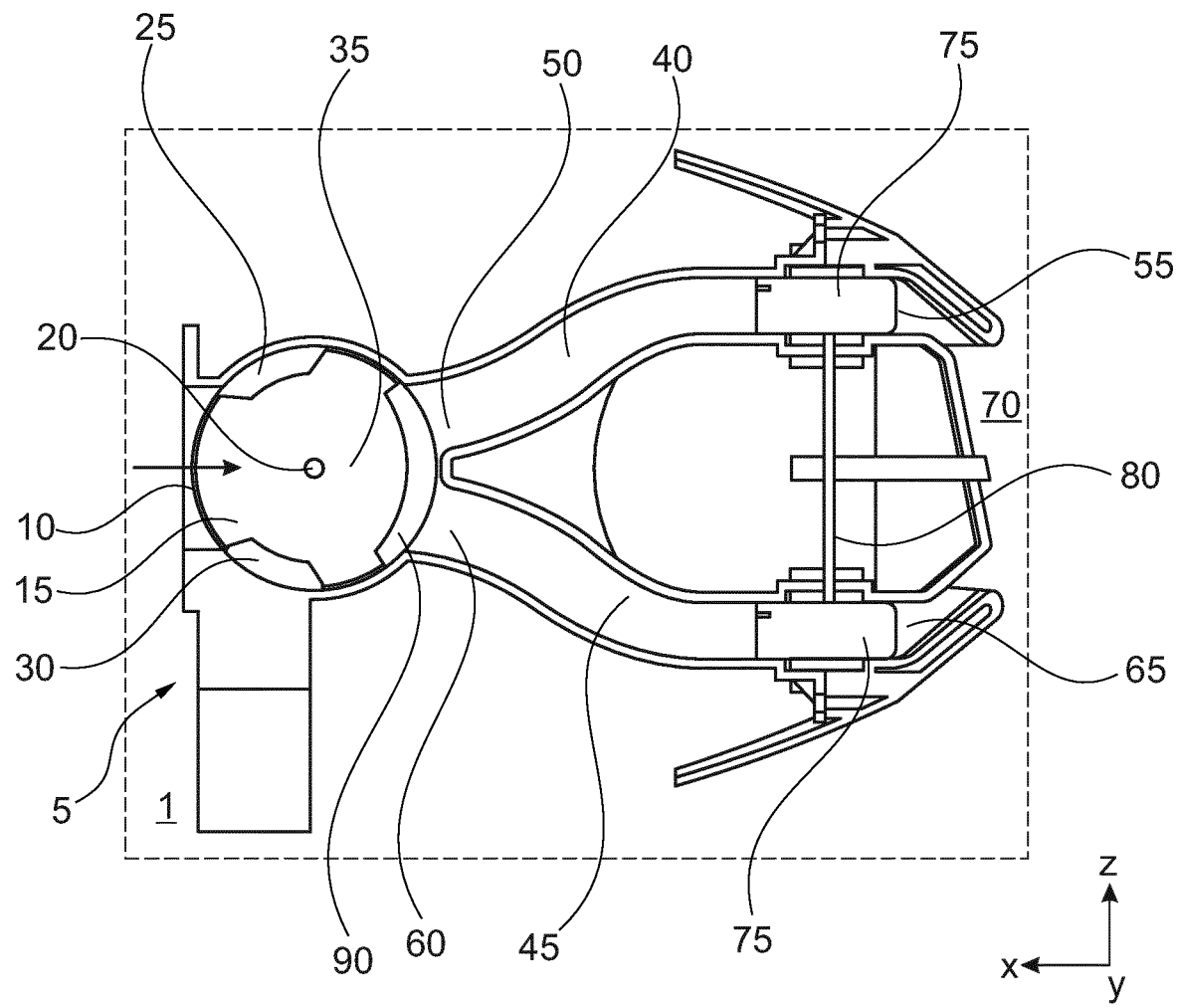
FIG. 3 is a schematic side view of an alternative air vent in a first operating position.

FIG. 3 illustrates an alternative embodiment of an air vent 5 which not only comprises a first portion 25 and a second portion 30 (to the function of which the previous statements apply), but also a third portion 90 which is located on the air adjuster 15. This covers in the operating position shown here the first air inlet opening 50 and the second air inlet opening 60 so that a discharge of air from the first air outlet opening 55 and the second air outlet opening 65 is prevented. Nonetheless, air can flow through the air guiding channel 35 in the y-z plane so that additional air outlet openings which are not shown here and which are connected in fluid terms to the air guiding channel 35 (that is to say, ones which are located with respect to FIG. 3 on this side and/or the other side of the paper plane) can be supplied.

Figure 4:
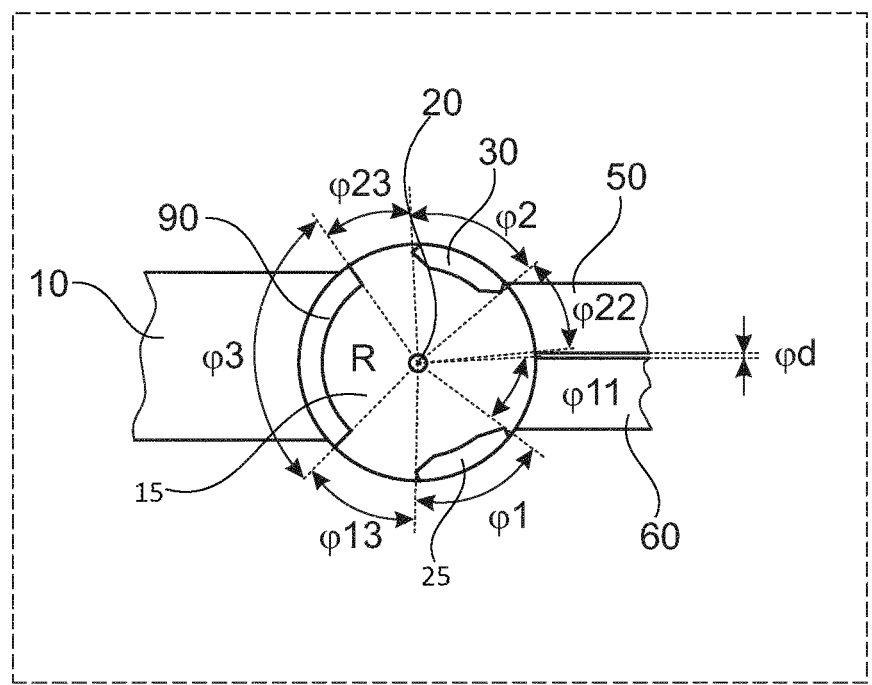
FIG. 4 shows a portion of the air vent illustrated in FIG. 3 in a second operating position.

In FIG. 4, the air adjuster 15 shown in FIG. 3 is again illustrated schematically, wherein the third portion 90 now covers the air supply channel 10. In this operating position, no air at all is directed through the air adjuster 15, as a result of which no air can flow through all the air outlet openings 55, 65 which are in fluid communication with each other (that is to say, also those which extend at this side or the other side of the paper plane of FIGS. 3 and 4) into the vehicle inner space 70. As can be seen in this figure, all of the faces of the respective first, second and third portions 25, 30 and 90 which are adjacent to the air supply channel 10, the first air inlet opening 50 and the second air inlet opening 65 have a radius R with respect to the rotation axis 20 which corresponds to the radius of the air adjuster 15. The first portion 25 has a direction angle $\varphi 1$, the second portion has a direction angle $\varphi 2$ and the third portion 90 has a direction angle $\varphi 3$. A spacing which is located between the first portion 25 and the third portion 90 has with the radius R a direction angle $\varphi 13$ and a spacing which is located between the second portion 30 and the third portion 90 has a direction angle $\varphi 23$. The first air inlet opening 50 has a direction angle $\varphi 11$ and the second air inlet opening 60 has a direction angle $\varphi 22$. The mutually adjacent sides of the first air inlet opening 50 and the second air inlet opening 60 are spaced apart from each other in accordance with a direction angle $\varphi d$. On the whole, according to this embodiment the following relationship applies:

$$\varphi 1+\varphi 13+\varphi 3+\varphi 23+\varphi 2+\varphi 22+\varphi d+\varphi 11=360°, \text{where}$$

$\varphi 1=\varphi 11$,
$\varphi 2=\varphi 22$,
$\varphi 3=\varphi 11+\varphi d+\varphi 22$, and
$\varphi 1>\varphi 13$,
$\varphi 2>\varphi 23$.

If, according to the embodiment shown in FIG. 1, no third portion 90 is provided, all the variables of the previous relationship indexed with a "3" are omitted, wherein the spacing located between the first portion 25 and the second portion 30 would correspond to the sum of the variables indexed with "3", which is, for example, 180°.

Figure 5:
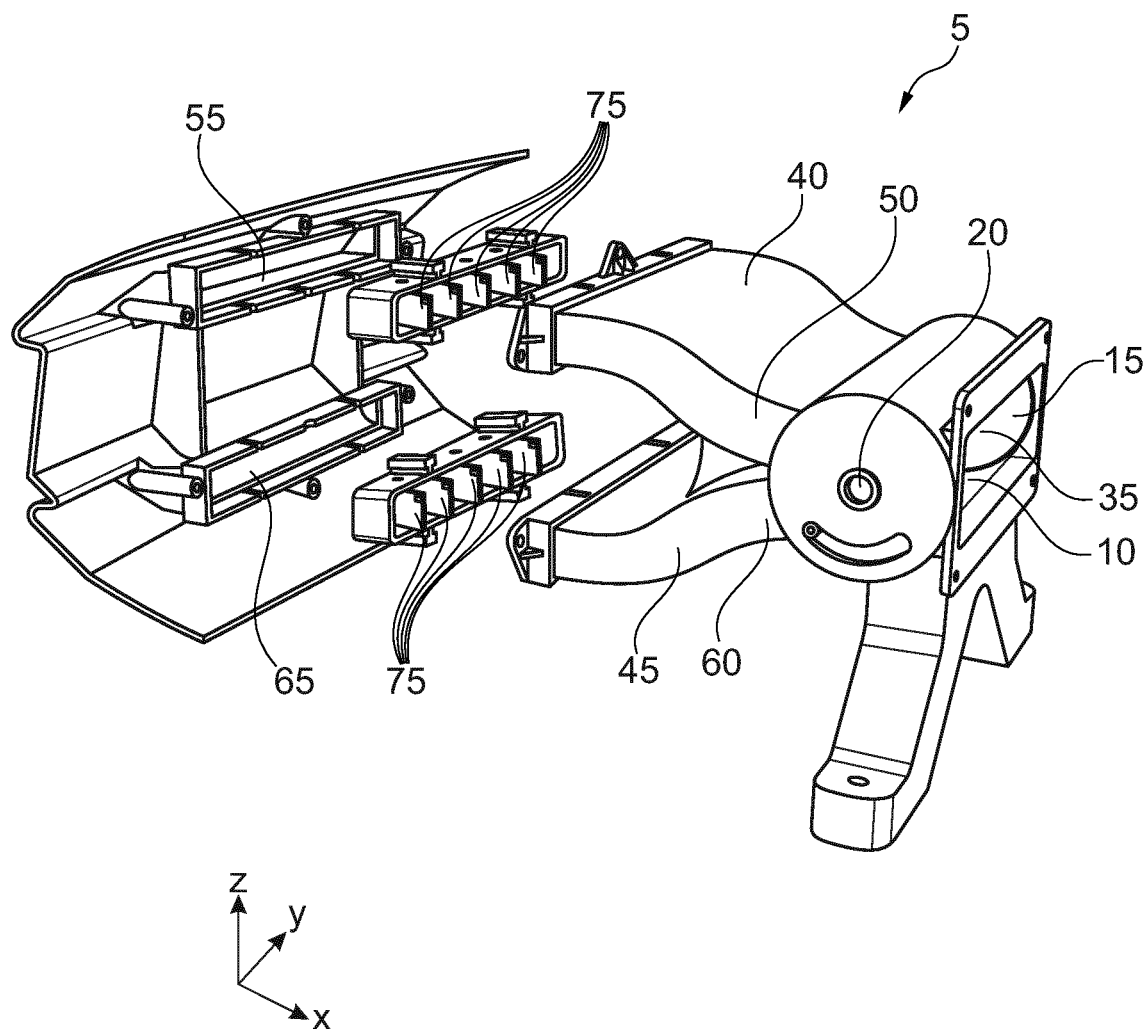
FIG. 5 is a perspective exploded illustration of the air vent of FIGS. 1 to 3.

In FIG. 5, the air vent 5 is shown as a perspective exploded illustration. As can be seen, in the width direction y thereof in the first air outlet opening 55 and the second air outlet opening 65 there are provided five plates 75 which can each be pivoted about a pivot axis which extends in a vertical direction z and which is not shown here. The two air outlet openings 55, 65 are constructed substantially as slots which extend in the y direction and which are spaced apart from each other in the z direction so that a very appealing aesthetic shape of the air vent 5 in the direction of the motor vehicle inner space 70 is provided.

LIST OF REFERENCE NUMERALS

1 Motor vehicle
5 Air vent
10 Air supply channel
15 Air Adjuster
20 Rotation axis
25 First portion
30 Second portion
35 Air guiding channel
40 First air discharge channel
45 Second air discharge channel
50 First air inlet opening
55 First air outlet opening
60 Second air inlet opening
65 Second air outlet opening
70 Motor vehicle inner space
75 Plates
80 Pivot axis
90 Third portion
x, y, z Axes of a motor-vehicle-specific Cartesian coordinate system which is known per se
$\varphi$ Direction angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An air vent for a motor vehicle comprising:
an air supply channel;
a first air discharge channel which branches off from the air supply channel and which comprises a first air inlet opening having a first air inlet opening angular extent ($\varphi 11$) and a first air outlet opening; and
a second air discharge channel which branches off from the air supply channel and which comprises a second air inlet opening having a second air inlet opening angular extent ($\varphi 22$) and a second air outlet opening, wherein
the first air inlet opening and the second air inlet opening are constructed to be parallel with each other in fluid terms,
the first air outlet opening and the second air outlet opening are spaced apart from each other,
an air adjuster which is for adjusting a quantity of air transported through the first air discharge channel and the second air discharge channel and which is arranged adjacent to the first air inlet opening and the second air inlet opening,
the air adjuster has a round cross-section at an outer side of which a first portion having a first portion angular extent ($\varphi 1$) and a second portion having a second portion angular extent ($\varphi 2$) are provided, the first portion and the second portion are spaced apart from each other with an air guiding channel being formed, the first portion selectively closes or at least partially releases the first air inlet opening, and the second portion selectively closes or at least partially releases the second air inlet opening, the first portion is arranged adjacent to the first air inlet opening and the second portion is arranged adjacent to the second air inlet opening, and the first portion angular extent is substantially equal to the first air inlet opening extent ($\varphi 1 = \varphi 11$) and the second portion angular extent is substantially equal to the second air inlet opening extent ($\varphi 2 = \varphi 22$), wherein the air adjuster further has a third portion having a third portion angular extent ($\varphi 3$), and the third portion selectively closes or opens the air supply channel to the air adjuster, and the third portion angular extent is greater than each of the first and second portion angular extents.

2. The air vent according to claim 1, wherein a cross-sectional area of the air guiding channel substantially corresponds to a cross-sectional area of a region of the air supply channel adjacent thereto.

3. The air vent according to claim 1, wherein a cross-sectional area of the first portion and/or the second portion at least corresponds to a cross-sectional area of a region of the air supply channel adjacent thereto.

4. The air vent according to claim 1, wherein at least one plate is located in the first air discharge channel and/or the second air discharge channel.

5. A motor vehicle comprising at least one air vent according to claim 1.

* * * * *